Sept. 27, 1960 R. A. GAISER 2,954,454
ELECTRICALLY CONDUCTING BENT GLASS WINDSHIELD
AND METHOD OF PRODUCING THE SAME
Original Filed Dec. 1, 1953 4 Sheets-Sheet 1

INVENTOR.
Romey A. Gaiser
BY
Nobbe & Swope
ATTORNEYS

INVENTOR.
Romey A. Gaiser
BY Nobbe & Swope
ATTORNEYS

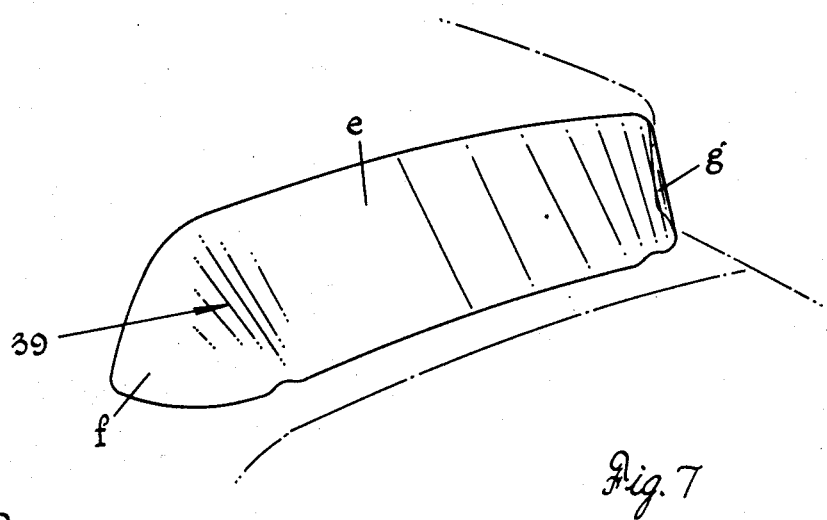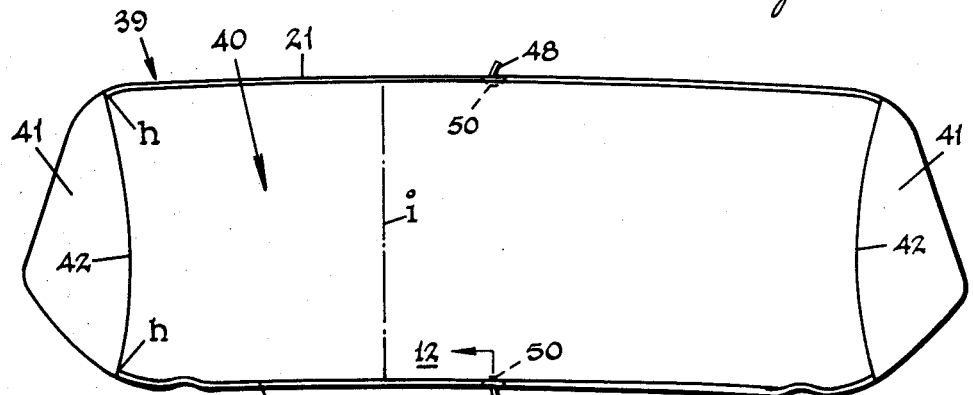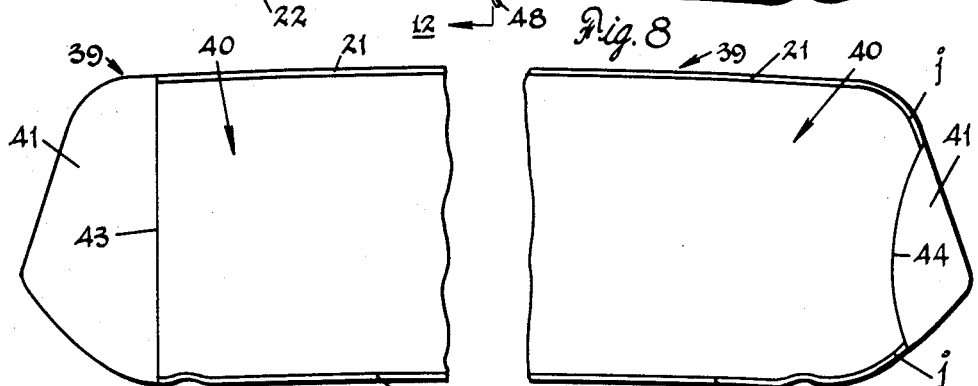

Sept. 27, 1960 R. A. GAISER 2,954,454
ELECTRICALLY CONDUCTING BENT GLASS WINDSHIELD
AND METHOD OF PRODUCING THE SAME
Original Filed Dec. 1, 1953 4 Sheets-Sheet 4

INVENTOR.
Romey A. Gaiser
BY
Nobbe & Swope
ATTORNEYS

United States Patent Office 2,954,454
Patented Sept. 27, 1960

2,954,454

ELECTRICALLY CONDUCTING BENT GLASS WINDSHIELD AND METHOD OF PRODUCING THE SAME

Romey A. Gaiser, Muncie, Ind., assignor to Libbey-Owens-Ford Glass Company, Toledo, Ohio, a corporation of Ohio Continuation of application Ser. No. 395,399, Dec. 1, 1953. This application July 30, 1956, Ser. No. 600,801

5 Claims. (Cl. 219—19)

The present invention relates broadly to improved automotive windshields or the like and to a novel method of producing the same. More particularly, this invention is essentially concerned with the provision of curved, one-piece windshields having an electrically conducting film for the removal or prevention of ice, frost and fog formation.

This application is a continuation of my co-pending application Serial No. 395,399, filed December 1, 1953, now abandoned, and entitled "Electrically Conductive Windshield."

The present trend in automobile body design to afford greater visual areas has found general acceptance in the increasingly popular one-piece windshields, which in addition to being curved in their central area and spanning the entire front of the car body, have been further rather sharply curved to include end portions or areas extending rearwardly through the corners and into the side areas of the car body. These windshields have been identified as "wrap-around" or, by the more expressive term, "panoramic" windshields.

In accordance with automotive safety codes, windshields are formed of laminated safety glass which is made up of two sheets or plates of glass laminated together with an interlayer of non-brittle thermoplastic material, such as polyvinyl butyral resin. Before the actual laminating, however, the glass sheets or plates are bent in pairs on suitable molds as they are conveyed through the controlled zones of a heated furnace. It has heretofore been conventional practice to pattern-cut these matched pairs of glass sheets before bending, so that the finished laminated unit would properly conform not only to the streamlined contour of the forward area or front of the automobile body but also to the outline of the windshield opening therein.

It is an aim of this invention to further increase the pleasure and safety of motoring by equipping such windshields with a transparent film or coating capable of conducting electrical energy and operating to remove accumulations of ice, frost or fog by internal heating of the glass. In order to provide an electrically conducting film on a surface of one or both of the glass sheets or plates, it has been found advantageous to carry out the filming operation in advance of the bending operation or when the sheets or plates are perfectly flat.

This filming operation, briefly stated, involves the application of strips of fusible material in spaced areas and preferably along the opposed margins of a glass sheet and in substantially parallel relation; heating the glass sheet to substantially its point of softening and simultaneously fusing the fusible material to form electrodes or bus bars upon the glass, and then spraying the surface of the heated glass sheet containing said electrodes with a suitable material, such as a tin halide, to form upon said sheet a transparent, continuous though extremely thin electrically conducting coating of tin oxide. During installation of the completed windshield, the electrodes are connected by suitable leads to a source of controlled electrical current to supply the conducting film.

In order to provide a completely satisfactory windshield that is bent through its central portion to a relatively shallow curve and in its ends is bent sharply upwardly and is also electrically conductive, methods and techniques which depart in a novel manner from those heretofore considered conventional practice are required. Primarily, a curved windshield of one-piece construction such as a "panoramic" windshield requires sheets or plates of glass of considerable length, and when bending such sheets or plates in pairs, it is essential that they not only nest accurately with one another but also that they assume an accurate predetermined curvature. I have found that this can best be accomplished if the glass sheets are bent before being pattern-cut to the outline of the finished windshield. Further, the bending of the sheets in block size facilitates the subsequent cutting of the bent sheets to pattern.

I have further discovered that, in producing an electrically conductive windshield of this type, important advantages are attained when the electrodes and the electrically conducting film are also applied to the glass sheets or plates prior to the bending thereof and while they are not only flat but also before they are cut to pattern.

It is therefore the primary object of this invention to provide an improved one-piece curved windshield which is also electrically conducting and a novel method for producing the same.

Another important object of the invention is to provide such a method in which the electrically conducting materials are applied to the glass sheets while said sheets are in a flat condition, after which they are bent to predetermined curvatures and then fabricated into finished windshields.

Another important object of the invention is to provide such a method wherein the electrically conducting materials are applied to predetermined selected areas of substantially rectangular, flat glass sheets, after which the sheets are successively bent, pattern-cut, and fabricated into finished windshields.

Another object of the invention is to provide such a method in which the electrodes are arranged in spaced relation on a surface of a flat glass sheet, such electrodes being located upon said sheet in predetermined relation with respect to the marginal edges of a pattern outline to be cut therefrom; the said flat sheet being also filmed with an electrically conducting material, then bent, cut to pattern, and laminated with component parts to provide a curved windshield having electrically conducting areas.

A further object of the invention resides in the provision of a deeply curved one-piece windshield having on the surface of one component glass sheet suitable electrodes for an electrically conducting film carried thereon, said electrodes being deposited on the sheet while flat in predetermined locations both with respect to the conduction of electrical energy through said film and to the patterned outline to be cut from the glass sheet after the same is bent.

A still further object of the invention resides in the provision of a one-piece curved windshield of the above character having selected areas of electrical conductivity and non-conductivity.

Other objects and advantages of the invention will become more apparent during the course of the following description when read in connection with the accompanying drawings.

In the drawings, wherein like numerals are employed to designate like parts throughout the same:

Fig. 7 is a perspective view of a representative form of one-piece bent windshield produced in accordance with the invention and as installed in an automobile;

Fig. 8 is a plan view of the bent windshield showing one arrangement or pattern of the electrically conducting film and electrodes therefor;

Fig. 9 is a fragmentary plan view of a bent windshield showing a second pattern of the electrically conducting film;

Fig. 10 is a fragmentary plan view of a bent windshield showing a third pattern of the electrically conducting film;

Ordinarily, the fabrication of laminated safety glass is conventionally carried out by the matching of two glass sheets or plates according to optical requirements; forming a so-called sandwich by interposing between the glass sheets a layer of non-brittle thermoplastic material, and then subjecting the laminate to heat and pressure within an autoclave to form a composite structure. For automotive windows and/or windshields, the glass sheets or plates, after being optically matched, are usually pattern cut to the outline of the desired opening of the vehicle and, in the case of windshields, the pairs of sheets have been, more recently, bent to conform to the streamlined contour of the forward end of the car body. With the advent of one-piece windshields, however, the heretofore conventional modes of bending have been obviated and new and improved forms of bending have been required to produce the desired curvatures.

As hereinbefore set forth, the newly developed one-piece windshields, formed by a relatively shallow central curved portion and sharply upwardly curving end portions, and popularly known as "panoramic" windshields, permit more complete, unobstructed forward vision with added freedom of sight through the corner areas of the car. The bending of glass sheets or plates for this purpose requires not only the shaping of the central area of the sheet but also the bending of the ends thereof upwardly through a critically sharp curve. The necessary length of sheet, plus the patterned outline to which it has been previously cut, has heretofore created a serious problem of support for the glass during bending, with the result that the marginal edges of the sheets, when bent in pairs, have suffered some distortion.

In order to meet this problem it is herein proposed as previously pointed out, that the glass sheets be bent before they are pattern cut. This is accomplished by placing two substantially rectangular glass sheets or "blanks" one upon the other and bending them simultaneously upon a suitable mold. In this way, the marginal portions of the blanks that are supported by the bending mold will be outside of the central portions or areas of the sheets which are subsequently pattern-cut from the blanks and which are laminated with one another to form a windshield of the desired outline and curvature. However, when the finished windshield is to be equipped with an electrically conductive film to remove or prevent ice, frost or fog formation, as herein disclosed, it was also found that most advantageous results could be obtained when the sheet to be filmed was provided with the necessary electrodes and then filmed while still flat. As hereinafter described, this invention involves a novel method of arranging the electrodes on the flat glass blank so that after it is bent and the sheet pattern-cut therefrom, the electrodes will be properly located and of adequate length to accomplish their purpose.

Figure 1:
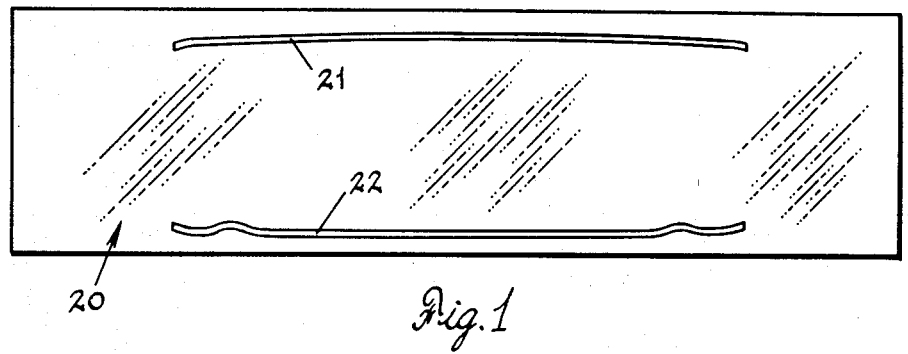
Fig. 1 is a view of a rectangular flat sheet of glass to which strips of electrode material have been applied in accordance with this invention.

Referring now more particularly to the drawings, there is shown in Fig. 1 a rectangular sheet or plate of glass 20 which will be hereinafter referred to as the glass "blank". The glass blank 20, after being thoroughly cleaned, is provided preferably along its longitudinal axis and adjacent the longitudinal edges thereof with predeterminedly arranged parallel strips 21 and 22 of a fusible material, such as a metal frit or the like, to form electrodes or bus bars. For example, a fired-on silver flux that may be used to form the electrodes may consist of 65.6% silver, 7.8% flux, 18% organic liquid binder, and 8.54% thinner. Whatever its composition, the electrode material is deposited on the surface of the glass blank according to the known outline of the pattern to be cut from the sheet and the opposed longitudinal edges of the pattern-cut sheet. Naturally, the contour of the pattern-cut sheet will vary with the required shape and/or bend of the finished windshield. It is therefore preferable to employ a jig or template by means of which the electrode material will be accurately deposited upon the glass blank to form the electrodes 21 and 22.

Figure 2:
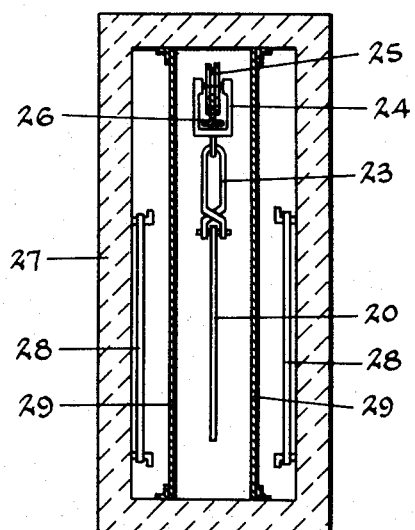
Fig. 2 is a transverse sectional view through a furnace for heating the glass sheet with the electrode material thereon prior to filming.

After allowing the electrode material to air dry, the glass blank 20 is supported by tongs or the like 23 in vertical relation to a carriage 24 which is provided with wheels 25 traversing a monorail 26, as shown in Fig. 2. The carriage 24 is then moved along the monorail 26 to convey the glass into and through a tunnel-type furnace 27, wherein it is brought to the temperature necessary for filming and for also baking the electrode material on the glass. The furnace 27 can be heated in any suitable manner, such as by means of electric resistance heaters 28, and may be equipped with baffles 29 to provide a more uniform temperature throughout.

Figure 3:
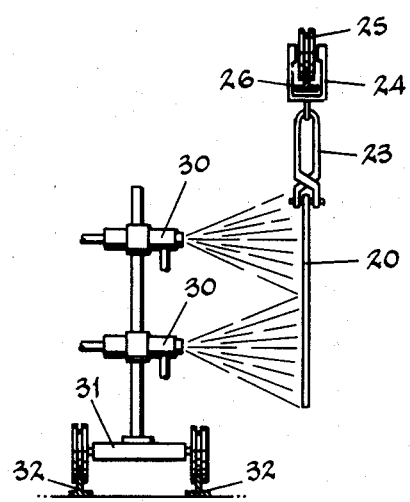
Fig. 3 is a diagrammatic illustration of one form of apparatus which may be employed to film the heated glass sheet.

During movement of the glass blank 20 through the furnace, it is heated to substantially the softening point of the glass. Since glass varies and has no precise softening point, it is not practicable to give any exact temperature to which the blank is heated before being removed from the furnace for filming, although it is in the neighborhood of 1250° F. for ordinary plate glass. The application of the electrically conducting coating to the glass is preferably done by spraying the entire surface of the hot glass blank carrying the electrodes 21 and 22 with a solution of a suitable tin compound, such as tin halide, until a film of tin oxide of the desired thickness and conductivity is formed although it may be formed in some other manner. However, as shown in Fig. 3, this is accomplished by means of spray guns 30 that are positioned at one side of the monorail 26, beyond the furnace 27 to effect a uniform application of the sprayed solution over the surface of the glass. The spray guns may be mounted on a wheeled carriage 31 traversing rails 32 which permits the spray from the guns to be reciprocated back and forth over the glass sheet to give the desired thickness of coating. After being coated, the glass is allowed to cool in air at room temperature, or otherwise.

After filming, the glass blank 20 is adapted to be bent to the desired curvature. However, at this time, the filmed blank is paired with a second blank that may or may not have been filmed but which has been matched with the blank 20 for optical quality. The thus paired glass blanks are then located one upon the other on a bending mold with the filmed blank preferably on the bottom and with its filmed surface disposed upwardly adjacent the lower surface of the upper blank.

Figure 4:
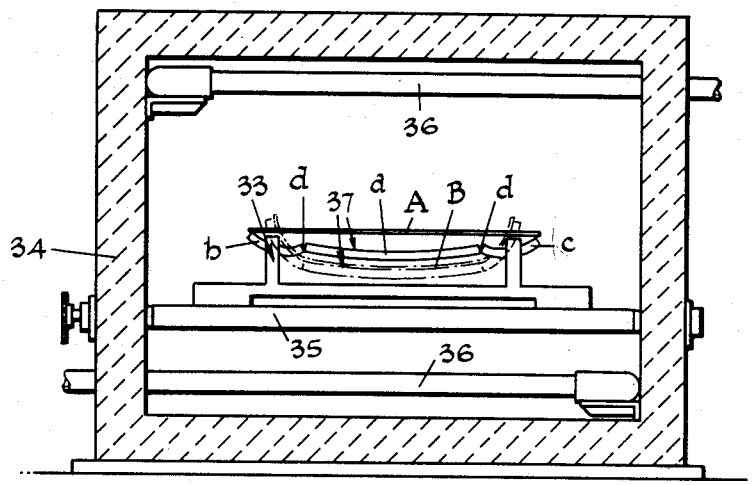
Fig. 4 is a transverse sectional view through a furnace within which the filmed glass sheet may be bent to the desired curvature.

As shown in Fig. 4, the matched glass blanks are preferably supported at their ends upon a mold indicated generally at 33 and which includes a central section $a$ and end sections $b$ and $c$ hingedly connected to the central section as at $d$. When the glass is sufficiently softened by heating, it settles downwardly upon the mold with the end sections $b$ and $c$ thereof acting to bend or "fold" the end portions of the glass blanks sharply upwardly in relation to the more shallow curvature imparted to the glass blanks in their central areas as they settle onto the central section $a$ of the mold.

The blanks, after being properly located on the mold, are carried into and through a furnace 34, upon a roller conveyor 35, the said furnace being provided with suitable heating means 36. From their initially located position in the flat, as indicated by full lines A in Fig. 4, the glass blanks are heated until they sag into contact with the shaping surfaces 37 of the mold sections $a$, $b$ and $c$ as shown in broken lines B. From the highly heated bending zone of the furnace 34, the bent glass blanks continue on through a zone of gradually decreasing temperature wherein the glass is slowly cooled and annealed.

Figure 5:
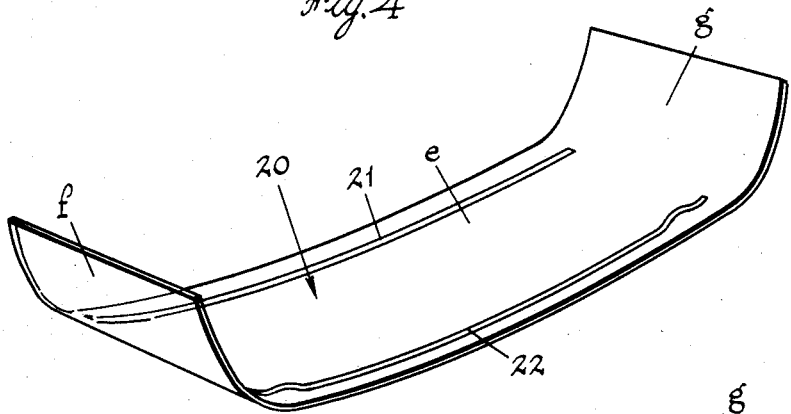
Fig. 5 is a perspective view of the glass sheet after it has been bent.
Figure 6:
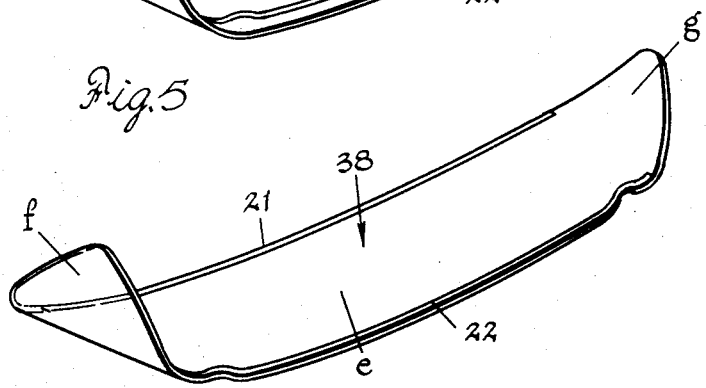
Fig. 6 is a perspective view of a sheet cut to pattern from the rectangular glass sheet shown in Fig. 5 and having the contour of the finished windshield.

Upon completion of the above-described operations, the glass blanks, and more especially the filmed blank 20, will appear as shown in Fig. 5, wherein it comprises a relatively shallow bent central portion or area $e$ and the more sharply bent end portions or areas $f$ and $g$. The blank is then scored or cut according to a predetermined template pattern to produce a sheet or plate of bent glass 38 as shown in Fig. 6, which conforms to the outline and curvature of the windshield to be produced. The cut is so made that when completed, the electrodes 21 and 22 will be disposed along the opposed longitudinal edges of the pattern-cut sheet 38 throughout the central portion $e$ thereof. In producing one-piece curved windshields of considerable length, the cutting of the glass to pattern subsequent to bending has been found very advantageous since the pattern-cut sheets "nest" or match more accurately when the cut is made. Likewise, by supporting the blank along lines outside of the area of the sheet to be pattern-cut therefrom, the tendency toward distortion of the cut sheet will be minimized.

Before completing the assembly of the lamination, the filmed sheet 38 is treated to provide the desired film area through which current will be carried. This area may be determined by factors such as commercial preference or the purpose for which the windshield will be used. For example, in Fig. 7 is shown a completed windshield 39 installed in an automobile, and in this case only the central portion or area $e$ of the windshield is provided with an electrically conducting coating, the coating having been removed from the bent end portions or areas $f$ and $g$. This is more particularly shown in Figs. 8, 9 and 10.

In Fig. 8, the central filmed portion or area of the sheet is indicated at 40 and is carried a relatively short distance outwardly into the end portions or areas 41 of the windshield which are substantially wedge-shaped so that their edges are disposed in converging relation to one another. The electrodes 21 and 22 are of a length coincident with that of the filmed area 40. It will be noted that the opposite ends of the electrodes extend slightly into the curved end portions of the windshield as indicated at $h$, which results in these end portions of the electrodes being closer together than the central portions thereof. In order to compensate for this and maintain a uniform density of current throughout the film with elimination of hot spots therein, the opposite ends of the filmed area 40 terminate in arcuate lines 42 which linearly have a length substantially equal to a straight line extending transversely between the electrodes at the central portion of the sheet as shown diagrammatically at $i$. The end portions of the windshield outwardly of the filmed area defined by the curved lines 42 in Fig. 8 do not contain any coating material. This may be obtained by suitably masking off said end portions before spraying or by "erasing" the filmed coating from the surface of the said end portions after the sheet has been pattern-cut. The removing or erasing of the filmed coating may be accomplished by conventional methods such as by subjecting the desired portion of the coating to suitable chemicals, obtaining a reaction with the composition of the coating and rinsing the residue from the glass surface. In any event, when the lines 42, denoting the end limits of the filmed area 40, have been established, the completed windshield will be afforded an electrically conducting area spanning the entire front of the car and extending slightly rearwardly through the corners.

On the other hand, the filmed area may be limited strictly to the central portion of the windshield. For this purpose, and as shown in Fig. 9, the electrodes 21 and 22 do not extend into the wedge-shaped end portions 41 of the windshield but are limited to the substantially rectangular central portion where the width between the opposed longitudinal electrodes is substantially equal and constant. The current flow between the said electrodes and through the filmed area 40 will likewise be equal to the end that the end limits thereof can be determined by the straight lines 43.

It may even be found advantageous to carry the effective filmed area farther out into the curved end portions of the windshield as in Fig. 10. Now since the flow path of the current is materially shortened (in a straight line) between the curved end portions $j$ of the electrodes, the density thereof is undesirably increased in the corner areas as to create "hot spots." To avoid this electrical disturbance, the ends of the filmed area are defined by a more sharply curved line as indicated at 44. This curvature is such that the electrical current density in these areas will be substantially the same as in the more centrally located areas of the sheet where the electrodes are parallel with one another.

In each of the above instances, the field of the filmed area is determined and the length of the electrodes is initially established by the extent of the areas of fusible material 21 and 22 deposited on the glass blank 20 while it is flat as shown in Fig. 1. Moreover, by accurately locating such areas through the use of a jig or template, the electrodes will follow the actual edge of the bent and cut sheet 38 as shown in Fig. 6.

Figure 11:
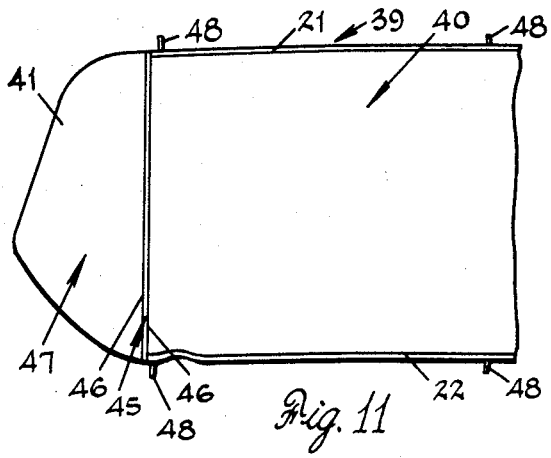
Fig. 11 is a fragmentary plan view of a bent windshield which shows a fourth pattern of the electrically conducting film.

A suitably established effective conducting area may also be afforded without complete removal of the filmed coating from the end areas 41 of the bent sheet 38 as shown in Fig. 11. This may be desirable in the event that the characteristics of the coating tend to impart a distinct, though perfectly transparent, iridescent tint to the normal, clear color of the glass. Without changing this naturally inherent tint or establishing a series of definitely different and undesirable color areas in the windshield, it is possible to separate such areas by means of a narrow open area as shown at 45. For this purpose, the electrodes 21 and 22 may be located on the sheet in accordance with any desired film area as shown in Figs. 8, 9 and 10. However, as shown in Fig. 11, the electrodes 21 and 22 are substantially the same as shown in Fig. 9 so that the effective electrically conducting film area 40 will be confined to the central portion of the windshield, and, while the end portions 41 will retain the filmed coating they will be separated and insulated from the area 40 by the narrow space 45 that is defined by the parallel lines 46 denoting the spaced end limits of the electrically conducting film area 40 and the non-conducting film area 47.

Figure 12:
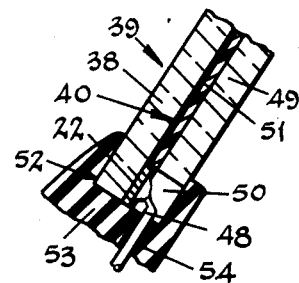
Fig. 12 is a vertical sectional view through the windshield showing one form of connection for the electrodes as taken on line 12—12 of Fig. 8.

The electrodes 21 and 22 may be provided with "lead-in" connections according to the desired distribution of electrical current and the potential thereof. As shown in Fig. 8, one centrally disposed lead 48 is provided for each electrode 21 and 22. To allow ample room for attaching the lead, as by soldering, when the windshield is installed, the inner glass sheet 49 of the laminated windshield may be notched as at 50 in Figs. 8 and 12. The windshield here disclosed comprises the outer and inner glass sheets 38 and 49 bonded together by an interlayer 51 of a thermoplastic material in a manner well known in the art. Likewise, when additional leads are required, they may be similarly attached when located as shown in Fig. 11 and connected in parallel to the current source. The small notched areas, when the windshield is installed, are located within the continuous groove 52 of the rubber channel or weather stripping 53 which conventionally supports and seals the windshield in the framework of the automobile. The notches are therefore both protected from the atmosphere and hidden from sight. When installed within the channel or weather stripping 53, the lead 50 is passed through an opening 54 in the wall thereof and may be connected to the source of electricity in any suitable manner.

Figures 13, 14, 15:
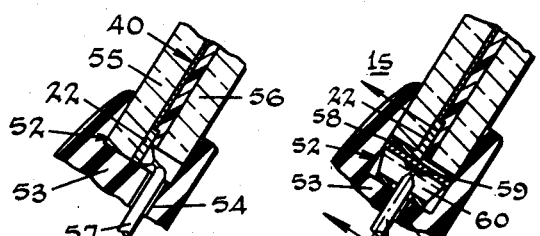
Fig. 13 is a vertical sectional view of a modified form of windshield and connection to the electrodes.
Fig. 14 is a similar sectional view showing a further modified form of electrical connection.
Fig. 15 is a sectional view taken on line 15—15 of Fig. 14.

According to the construction shown in Fig. 13, the "outboard" sheet 55 of the lamination may be pattern-cut to a relatively larger outline than the "inboard" sheet 56. This will provide a margin on which the electrodes 21 and 22 will be exposed and easily available for attachment of the lead-in connections 57. The connections 57 may be attached singly as in Fig. 8 or can be provided in parallel as shown in Fig. 11.

For other special installations of the windshield, a connection between the electrodes 21 and 22 and an electrical source can be obtained by means of flexible, spring-pressed contactors of the type shown in Figs. 14 and 15. For this purpose, and before lamination of the glass sheets, the effective areas of electrodes 21 and 22 are extended around and onto the edge surfaces of the outer sheet 55. This may be accomplished by applying a similar material along the edge of the glass either continuously the full extent of the electrodes or at suitable points therealong. An L-shaped electrode 58 will thus be provided on the marginal area of the sheet and across its adjacent edge.

This electrode 58 as will be seen in Figs. 14 and 15 is engaged by a strip or bar 59 that is located in the groove 52 of the rubber mounting channel 53. The bar 59 is supported by means of a bowed leaf spring 60 resting on the bottom of the groove. The spring may be provided in its central area with an opening through which the lead-in conductor 61 is passed and attached to the bar 59. In completing this type of windshield assembly, the leads 61 are passed through openings 54 in the channel and the associated bars 59 and springs 60 are located within the groove 52. The windshield is then fitted into the groove and when installed will locate the electrodes 58 in engagement with the contacting bars 59.

As above described, the lead-in connections to the electrodes for the electrically conducting film are located with respect to the upper and lower edges of the windshield when in its installed position. It is, however, not absolutely necessary that the connections be made in such areas of the windshield. On the other hand, other locations of the lead-in conductors may be preferable, being dependent upon the most efficient positioning of the controls to which they are connected or to the framework of the opening in which the windshield is positioned. For instance, in Figs. 16, 17 and 18, other methods of arranging the lead-in conductors are disclosed which will enable the extension of the lead-in wires through the car framework for connection to one or the opposite ends of the windshield.

Such an arrangement requires that the electrodes be initially formed in a pattern covering substantially the entire margin of the pattern-cut sheet not only along the opposed substantially parallel longitudinal edges of the central portion but also along the edges of at least one of the bent, wedge-shaped end portions. Thus, the character of the electrodes 62 and 63 will be determined by the ultimate manner of electrical connection and definitely established at the time that the areas of fusible material are applied to the flat glass blanks.

Figure 16:
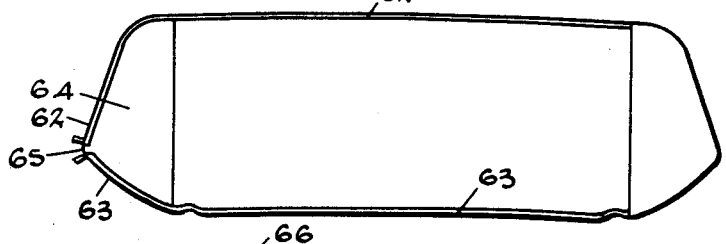
Fig. 16 is a plan view of a bent windshield illustrating one way of connecting the electrodes to a source of electrical current.

As shown in Fig. 16, the electrode 62 extends along one longitudinal edge of the central portion of the glass sheet and then along one converging side of the curved end portion 64 and terminates in the vicinity of the extreme tip 65. Likewise, the electrode 63 is disposed along the opposite longitudinal edge of the glass sheet and along the convergent side of the end portion 64 to terminate in closely spaced relation to the end of electrode 62. This will permit the lead-in conductors to be attached to said electrodes at an extreme end of the windshield. In this instance, the central portion of the sheet is filmed while the opposite end portions 64 are not.

Figure 17:
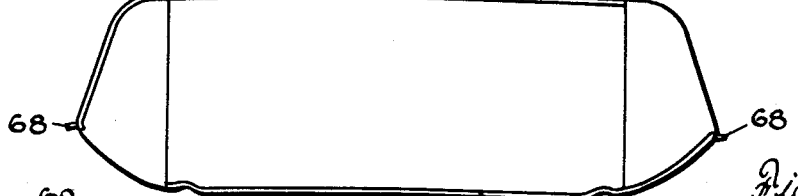
Fig. 17 is a similar view illustrating a second type of electrical connection.

On the other hand, as shown in Fig. 17, one electrode 66 may extend along one longitudinal edge of the windshield and into one end area 64, while the other electrode pattern 67 will extend along the opposite longitudinal edge and into the opposite end area of the windshield. This particular arrangement of the electrodes will thus afford means for connecting a lead-in conductor 68 to one of the electrodes at each end of the windshield.

Figure 18:
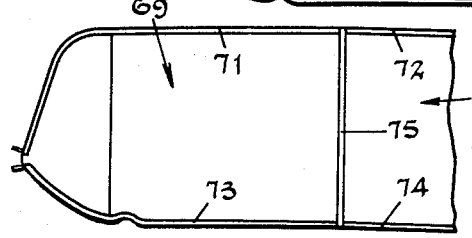
Fig. 18 is a fragmentary plan view of a bent windshield wherein spaced electrically conductive areas may be electrically connected and controlled at their respective ends.

The windshield construction illustrated in Fig. 18 departs from any previously described in that there is provided a means for controlling the supply of electrical current to individual sections of the windshield. This may be found desirable where it is of advantage to more rapidly heat one-half of the windshield, as for example, to remove ice or frost from the left-hand or driver's side more rapidly than from the right-hand side. By means of rheostat controls, the current supplied to either half of the windshield can be thus monitored. For this purpose, individual coated areas 69 and 70 are formed on the windshield by providing two spaced electrodes 71 and 72 along one longitudinal edge of the windshield and two complementary electrodes 73 and 74 along the opposite longitudinal edge. To further provide two individually controlled film areas, in addition to whatever film coating is removed from the end areas, a space 75 is cleared across the medial area of the blank after it has been bent and pattern-cut as shown in Fig. 6. The completed windshield will thus present an appearance substantially as shown in Fig. 18 wherein the two equally spaced pairs of electrodes 71, 73 and 72, 74 are terminated short of each other at their inner adjacent ends to supply electrical current to two separated film areas 69 and 70 which are spaced apart by the clear area or strip 75.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:
1. A windshield for automobiles and the like, comprising two elongated sheets of glass and an interposed layer of thermoplastic material bonded thereto, said windshield having a middle portion and end portions relatively sharply bent with respect to said middle portion, a trans- parent electrically conductive film on one surface of one of the glass sheets substantially covering the middle portion thereof and terminating inwardly of the outer ends of the bent end portions, and electrodes arranged along opposite longitudinal margins of the filmed surface and in electrical contact with said film, at least one of said electrodes extending at one end of the glass sheet beyond the electrically conducting film toward the outer end of said glass sheet.

2. A windshield for automobiles and the like, comprising two elongated sheets of glass and an interposed layer of thermoplastic material bonded thereto, said windshield having a middle portion and end portions relatively sharply bent with respect to said middle portion, a transparent electrically conductive film on one surface of one of the glass sheets, and electrodes arranged along opposite longitudinal margins of the filmed surface and in electrical contact with said film, said electrically conductive film and said electrodes being divided into spaced independent areas.

3. A windshield for automobiles and the like, comprising two elongated sheets of glass and an interposed layer of thermoplastic material bonded thereto, said windshield having a middle portion and end portions relatively sharply bent with respect to said middle portion, a transparent electrically conductive film on one surface of one of the glass sheets substantially covering the middle portion thereof and terminating inwardly of the outer ends of the bent end portions, and electrodes arranged along opposite longitudinal margins of the filmed surface and in electrical contact with said film, said electrically conductive film and said electrodes being divided into spaced independent areas and at least one of said electrodes extending at one end of the glass sheet toward the outer end of the respective curved end portion.

4. A winshield for automobiles and the like, comprising two elongated sheets of glass and an interposed layer of thermoplastic material bonded thereto, said windshield having a middle portion and end portions relatively sharply bent with respect to said middle portion and one of said glass sheets being provided with marginal notches, a transparent electrically conductive film on one surface of another of said glass sheets, electrodes arranged along opposite longitudinal margins of the filmed surface and in electrical contact with said film, and lead-in wires received within said notches and engaging said electrodes.

5. A windshield for automobiles and the like, comprising two elongated sheets of glass and an interposed layer of thermoplastic material bonded thereto, said windshield having a middle portion and end portions relatively sharply bent with respect to said middle portion, a transparent electrically conductive film on one surface of one of the glass sheets, and electrodes arranged along opposite longitudinal margins of the filmed surface and in electrical contact with said film, said filmed glass sheet being relatively larger than another of said glass sheets to expose said electrodes, and lead-in wires attached to the exposed portions of said electrodes.

References Cited in the file of this patent

UNITED STATES PATENTS

| | | |
|---|---|---|
| 1,978,089 | Jones | Oct. 23, 1934 |
| 2,367,111 | Fowler | Jan. 9, 1945 |
| 2,470,509 | Marini | May 17, 1949 |
| 2,557,983 | Linder | June 26, 1951 |
| 2,569,773 | Orr | Oct. 2, 1951 |
| 2,593,405 | Beckham | Apr. 22, 1952 |
| 2,648,752 | Saunders | Aug. 11, 1953 |
| 2,676,117 | Colbert et al. | Apr. 20, 1954 |
| 2,681,405 | Gaiser | June 15, 1954 |
| 2,701,296 | Crawford | Feb. 1, 1955 |
| 2,725,320 | Atkeson et al. | Nov. 29, 1955 |
| 2,741,570 | Gaiser | Apr. 10, 1956 |
| 2,808,351 | Colbert et al. | Oct. 1, 1957 |

FOREIGN PATENTS

| | | |
|---|---|---|
| 200,474 | Australia | Dec. 14, 1955 |